Patented May 26, 1953

2,639,992

UNITED STATES PATENT OFFICE 2,639,992

STABILIZED PULVERULENT COMPOSITIONS AND PROCESS OF MANUFACTURE THEREOF

Edwin W. Tillotson, Pittsburgh, Pa., assignor to Garco Products, Inc., Allegheny County, Pa., a corporation of Pennsylvania No Drawing. Application July 20, 1950, Serial No. 175,032

6 Claims. (Cl. 106—52)

The present invention relates to stabilized pulverulent compositions containing finely divided glass and to a process of obtaining these compositions.

One object of the invention is to provide means for controlling the alkalinity of a pulverulent mixture, including a substantial proportion of glass, during storage and handling thereof.

A second object of the invention is the provision of a stabilized finely divided silica-glass mixture which is commercially acceptable in the production of vitreous ware.

Other objects and advantages of the invention will be apparent from the following detailed description of a preferred embodiment thereof:

Mixtures containing finely divided glass have achieved a definite utility in certain industrial applications. For example, some types of cellular glass are formed from such mixtures. Enameling or glazing slips and even the molding matrix include quantities of pulverized glass. Despite the advantages to be gained through the ready availability of glass in these mixtures, there is an accompanying problem of material control. The finely divided glass particles present a large total surface area susceptible of attack by water. Leaching of the alkalies in the glass upon contact with moisture results in the formation of basic compounds, such as sodium hydroxide, and so increases the alkalinity of the mixture. The degree and time of hydrolysis are, of course, almost impossible to predict, and the erratic increase in alkalinity will create operational difficulties and losses.

Briefly stated, therefore, my invention contemplates the addition of an acidic material to a mixture containing finely divided glass, in order to neutralize alkali formed therein upon exposure to moisture and thereby to maintain a reasonably constant pH in that mixture.

It will of course be readily apparent that all acidic materials will not be applicable to the invention. Since many glass containing compositions are admixed with water during their preparation or use, a readily soluble acid component would be washed out thereby, and its stabilizing effect lost. I have ascertained the metallic salts of fluosilicic acid to be particularly adapted for stabilization according to the provisions of my invention. These compounds have a low solubility in water and accordingly will not be removed during the ordinary processing operations. The compounds are stable to a degree that they will not induce decomposition within the glass mixtures being protected thereby, yet their acidic nature will insure rapid neutralization of free bases liberated in those mixtures. Of the many metallic fluosilicates, I prefer to employ potassium fluosilicate because of its ready availability, reasonable cost, and the nature of its operations in actual use.

The invention is not limited in its application to any particular glass containing mixtures, except insofar as the glass is in finely divided form. I have been interested in the stabilization of waste sand mixtures resulting from the grinding or surfacing of plate glass with sand as an abrasive. This material is so fine that nearly all of it will pass a screen of 325 mesh and it ordinarily contains from 12 to 25 per cent of glass. Because of its fine state of division it is readily combined with clays, lime and comparable materials, and may be used in the manufacture of various ceramic wares. In this instance the glass will serve as a substitute for a portion of the fluxing agents normally employed. But, as previously mentioned, the glass is in a form most open to attack by moisture and even with careful control unstabilized waste sand mixtures occasion operational difficulties which preclude its use.

In accordance with my invention, the waste sand-glass mixture is stabilized by adding thereto a small quantity of finely divided alkali metal fluosilicate and preferably potassium fluosilicate. For convenience, the addition accompanied by agitation or other suitable mixing may be made to a slurry of the waste sand after the raw material, discharged from the plate glass grinding operation, has been purified and concentrated. The treated slurry is then filtered and dried. The stabilized mixture will have a pH of about 4.0, and this will remain constant indefinitely in the absence of moisture.

The amount of potassium fluosilicate required to stabilize a waste sand-glass mixture will depend upon the initial pH of the mixture undergoing treatment. It has been observed that a waste sand slurry, purified and thickened, has a pH of from 10.0 to 10.5. Potassium fluosilicate in an amount of from 0.75 to 3 per cent by weight of the dry solids content of the slurry will reduce the pH thereof below 4, and will maintain an acid condition for a prolonged period of time. Larger amounts of potassium fluosilicate may be incorporated if desired, although such procedure will be uneconomical. Smaller amounts of potassium fluosilicate are permissible where the mixture being stabilized is in substantially dry form and will not be exposed to highly humid conditions.

By way of a specific example, to a waste sand-glass mixture, purified and thickened to contain approximately 50 per cent by weight of solids, was added an amount of finely divided potassium fluosilicate equal to 1.25 per cent by weight of the dry solids content of the slurry. The mixture was agitated for 15 minutes to insure thorough dispersion, and then filtered. The initial slurry had a pH of 10.0. The filter cake had a pH of 3.85. This treated filter cake, containing approximately 18 per cent by weight of residual moisture, was stored at 100° F. to demonstrate its stability. The following table illustrates the effectiveness of the treatment:

| Days of Storage | pH |
|---|---|
| 0 | 3.85 |
| 8 | 4.21 |
| 14 | 4.41 |
| 21 | 4.62 |
| 28 | 5.01 |
| 42 | 5.52 |
| 49 | 5.55 |
| 63 | 7.00 |

Although the hydrogen ion concentration is normally considered as a measure of the acidity or alkalinity of a solution, for the purposes of this invention, the expression denotes the acidity or alkalinity of a suspension or slurry of solids in water. Dry or substantially dry samples of stabilized mixtures are dispersed in water to form a slurry which may be evaluated simply and quickly.

It will be apparent from the foregoing description that the desired stabilization is obtained through the application of my inventive concept. The controlled alkalinity of the waste sand-glass mixture permits the incorporation thereof in ceramic batches without difficulty. The previously observed operational difficulties accompanying the use of unstabilized mixtures containing finely divided glass are no longer a problem. It is clear, therefore, that my invention has made available to the ceramics industry a vast supply of valuable raw material hitherto-fore regarded as impractical or unusable.

What I claim is:

1. A process of stabilizing a pulverulent mixture consisting essentially of finely divided glass and silica which comprises incorporating therewith from 0.75 to 3 per cent by weight of potassium fluosilicate.

2. A process of stabilizing a pulverulent mixture consisting essentially of finely divided silica and glass which comprises incorporating therewith approximately 1 per cent by weight of potassium fluosilicate.

3. A process of stabilizing a pulverulent mixture consisting essentially of finely divided silica and glass which comprises forming a slurry of the pulverulent mixture containing approximately 50 per cent by weight of solids, incorporating 1.25 per cent by weight of the solids content of the slurry of finely divided potassium fluosilicate, agitating the treated slurry to insure homogeneity thereof, and filtering the slurry.

4. A pulverulent mixture of controlled alkalinity consisting essentially of finely divided glass and silica and from 0.75 to 3 per cent by weight of potassium fluosilicate.

5. A pulverulent mixture of controlled alkalinity consisting essentially of finely divided silica and glass having admixed therewith approximately 1 per cent by weight of potassium fluosilicate.

6. A pulverulent mixture of controlled alkalinity containing from 74 to 87 per cent by weight of finely divided silica, from 12 to 25 per cent finely divided glass and approximately 1 per cent by weight of finely divided potassium fluosilicate.

EDWIN W. TILLOTSON.

References Cited in the file of this patent

FOREIGN PATENTS

| Number | Country | Date |
|---|---|---|
| 367,537 | Germany | 1923 |